US011766803B2

(12) United States Patent
Kani et al.

(10) Patent No.: US 11,766,803 B2
(45) Date of Patent: Sep. 26, 2023

(54) GUIDE RULER FOR PORTABLE MACHINING APPARATUS

(71) Applicant: MAKITA CORPORATION, Anjo (JP)

(72) Inventors: Toshiyuki Kani, Anjo (JP); Hiromu Goto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 748 days.

(21) Appl. No.: 16/924,918

(22) Filed: Jul. 9, 2020

(65) Prior Publication Data
US 2021/0060812 A1 Mar. 4, 2021

(30) Foreign Application Priority Data

Aug. 28, 2019 (JP) .................................. 2019-155679

(51) Int. Cl.
*B27B 9/04* (2006.01)
*B23D 59/00* (2006.01)
B27C 5/10 (2006.01)
B23D 45/16 (2006.01)

(52) U.S. Cl.
CPC .............. *B27B 9/04* (2013.01); *B23D 59/002* (2013.01); *B23D 45/16* (2013.01); *B27C 5/10* (2013.01)

(58) Field of Classification Search
CPC ................................ B27B 9/04; B23D 59/002
USPC .................................................... 33/484, 640
See application file for complete search history.

(56) References Cited

U.S. PATENT DOCUMENTS

| 3,673,689 | A | * | 7/1972 | Magnotto | .............. | B25H 7/005 |
| | | | | | | 33/471 |
| 4,779,354 | A | * | 10/1988 | Hill | .................... | B23Q 17/2216 |
| | | | | | | 33/640 |
| 4,901,444 | A | * | 2/1990 | Maschmeier | ........ | B25H 1/0078 |
| | | | | | | 33/426 |
| 5,035,061 | A | * | 7/1991 | Bradbury | ............. | B23Q 9/0028 |
| | | | | | | 30/373 |
| 6,263,584 | B1 | * | 7/2001 | Owens | ................... | B23Q 17/24 |
| | | | | | | 33/DIG. 1 |

(Continued)

FOREIGN PATENT DOCUMENTS

DE   10 2006 060 822 A1   6/2008
EP        2 581 166 A1   4/2013

(Continued)

OTHER PUBLICATIONS

Jan. 31, 2023 Office Action issued in Japanese Patent Application No. 2019-155679.

(Continued)

*Primary Examiner* — George B Bennett
(74) *Attorney, Agent, or Firm* — Oliff PLC

(57) ABSTRACT

A positioner positions a guide ruler relative to a workpiece that is adjacent to the guide ruler while more stably retaining the guide ruler at the locked position without causing interference with a cutting operation. A positioner that positions a ruler body relative to a workpiece includes a contact member to be in contact with an edge of the workpiece and extendable along the edge of the workpiece, a support supporting the contact member in a manner rotatable on a lower surface of the ruler body, and a position retainer that retains the contact member at a rotational position.

20 Claims, 17 Drawing Sheets

(56) References Cited

U.S. PATENT DOCUMENTS

| | | | |
|---|---|---|---|
| 6,757,981 B2* | 7/2004 | Hampton | B27B 9/04 30/372 |
| 7,484,308 B2* | 2/2009 | Stravitz | B43L 13/24 33/465 |
| 8,607,465 B1* | 12/2013 | Edwards | G01B 3/56 33/471 |
| 8,850,939 B2* | 10/2014 | Patella | B27B 25/10 144/253.7 |
| 9,156,184 B2* | 10/2015 | Stoffel | B23Q 9/0042 |
| 9,599,447 B2* | 3/2017 | Cruickshanks | G01B 3/563 |
| 2014/0090261 A1* | 4/2014 | Jones | G01B 3/56 33/418 |
| 2018/0290327 A1 | 10/2018 | Goto et al. | |
| 2021/0122080 A1* | 4/2021 | Eilts | B23Q 9/0042 |
| 2021/0268618 A1* | 9/2021 | Spengler | B25H 1/0078 |

FOREIGN PATENT DOCUMENTS

| | | |
|---|---|---|
| EP | 2 581 167 A1 | 4/2013 |
| JP | 2000-308922 A | 11/2000 |
| JP | 2006-334886 A | 12/2006 |
| JP | 2007-118230 A | 5/2007 |
| JP | 2011-143525 A | 7/2011 |
| JP | 2011-143526 A | 7/2011 |
| JP | 2013-086277 A | 5/2013 |
| JP | 2013-086278 A | 5/2013 |
| JP | 2017-222081 A | 12/2017 |
| JP | 2018-176310 A | 11/2018 |
| JP | 2019-005920 A | 1/2019 |
| JP | 2019-072785 A | 5/2019 |
| JP | 2019-089280 A | 6/2019 |

OTHER PUBLICATIONS

Apr. 13, 2023 Office Action Issued in Chinese Patent Application No. 202010620190.2.

* cited by examiner

GUIDE RULER FOR PORTABLE MACHINING APPARATUS

CROSS-REFERENCE TO RELATED APPLICATIONS

This application claims the benefit of priority to Japanese Patent Application No. 2019-155679, filed on Aug. 28, 2019, the entire contents of which are hereby incorporated by reference.

BACKGROUND

1. Technical Field

The present invention relates to a gauge for guiding a portable machining apparatus in a machining direction.

2. Description of the Background

A workpiece may be cut using a portable machining apparatus including a base to be in contact with the workpiece and a machining body having a circular blade supported on the upper surface of the base. A guide ruler may be used to guide the cutting edge precisely along a guideline particularly for a long stroke of cutting. The guide ruler includes a long flat plate, which may be referred to as a long gauge. The guide ruler in use is placed on the upper surface of the workpiece. The base of the portable machining apparatus is placed in contact with the upper surface of the guide ruler placed on the upper surface of the workpiece. To guide the base of the portable machining apparatus, the guide ruler typically has a guide rail on the upper surface.

The guide ruler in use is locked at a predetermined position relative to the workpiece. The guide ruler thus has a mechanism for positioning relative to an edge of the workpiece. The guide ruler typically includes a positioner as the positioning mechanism. The positioner causes the blade to cut into the workpiece at the edge at right angles for orthogonal cutting across the length or at oblique angles for oblique cutting across the length.

A positioner described in German Patent Application Publication No. 102006060822 (hereafter, Patent Literature 1) includes a long base to be in contact with an edge of a workpiece. The base has one end connected to the back surface of the guide ruler in a rotatable manner. With a thumbscrew tightened at a predetermined distance from the rotational connection, the base is locked at the rotational position to position the guide ruler for guiding the blade either orthogonally or obliquely.

A positioner described in Japanese Unexamined Patent Application Publication No. 2000-308922 (hereafter, Patent Literature 2) includes an auxiliary guide to be in contact with an edge of a workpiece. The auxiliary guide is locked against an angle-marked holder fastened to the guide ruler by turning a lock knob.

BRIEF SUMMARY

The positioner described in Patent Literature 1 has the base largely protruding from the edge of the guide ruler, thus interfering with the operation. The positioner described in Patent Literature 2 has the auxiliary guide locked by tightening a single threaded shaft serving also as the rotational shaft of the auxiliary guide. The auxiliary guide once locked is thus likely to be displaced under, for example, an external force, thus decreasing the operability.

One or more aspects of the present invention are directed to a positioner for positioning a guide ruler relative to a workpiece that is adjacent to the guide ruler while more stably retaining the guide ruler at the locked position without causing interference with a cutting operation.

One aspect of the present invention provides a guide ruler for guiding a portable machining apparatus in a machining direction relative to a workpiece, the guide ruler including:
 a ruler body; and
 a positioner configured to position the ruler body relative to the workpiece, the positioner including
  a contact member to be in contact with an edge of the workpiece, the contact member being extendable along the edge of the workpiece,
  a support supporting the contact member in a manner rotatable on a lower surface of the ruler body, and
  a position retainer configured to retain the contact member at a rotational position.

BRIEF DESCRIPTION OF DRAWINGS

FIG. 9 is a bottom view of a first member and a second member supported in a manner slidable relative to each other, with a wider portion allowing a guide protrusion to pass through.

DETAILED DESCRIPTION

Figure 1:
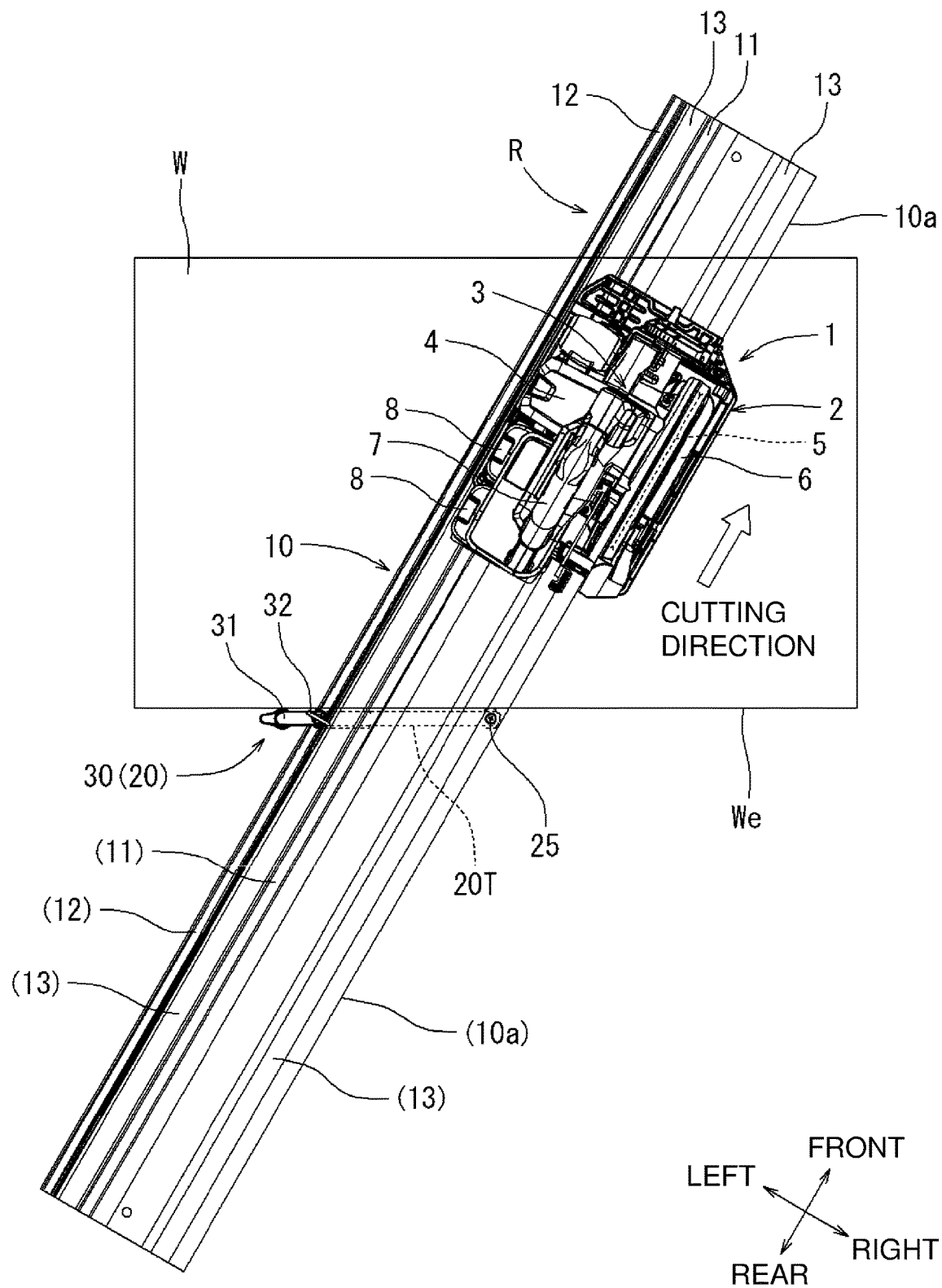
FIG. 1 is a plan view of a guide ruler receiving a portable machining apparatus placed on an upper surface of a ruler body for cutting a workpiece obliquely right-frontward relative to an edge of the workpiece.

An embodiment will now be described with reference to FIGS. 1 to 17. FIG. 1 is a diagram of a guide ruler R according to the present embodiment receiving a portable machining apparatus 1 for cutting a workpiece W. The portable machining apparatus 1 illustrated in FIG. 1 is a portable circular saw. The portable circular saw cuts the workpiece W, such as wood, by rotating a circular blade 5 referred to as a chip saw. The workpiece W is, for example, a rectangular flat board. An operator who is typically in front of the workpiece W (downward in FIG. 1) moves the portable machining apparatus 1 (for a cutting operation). In the cutting operation, the portable machining apparatus 1 is moved frontward from near the operator to cause the blade 5 to cut into the workpiece W at an edge We. In FIG. 1, the solid-white arrow indicates the direction in which the portable machining apparatus 1 is moved or the direction in which the blade 5 moves and the cutting proceeds (machining direction). The front herein refers to the direction in which the cutting proceeds. The rear herein refers to the direction toward the operator. The right-left direction is defined as viewed from the operator.

The guide ruler R defines the moving direction of the portable machining apparatus 1. The guide ruler R includes a ruler body 10 and a positioner 20. The ruler body 10 is a thin flat plate elongated in the front-rear direction and having a uniform width in the right-left direction. The positioner 20 positions the ruler body 10 relative to the workpiece. The ruler body 10 includes an aluminum base formed by extrusion molding. The ruler body 10 in use is placed on the upper surface of the workpiece W. The ruler body 10 receives the portable machining apparatus 1 on its upper surface.

Figure 2:
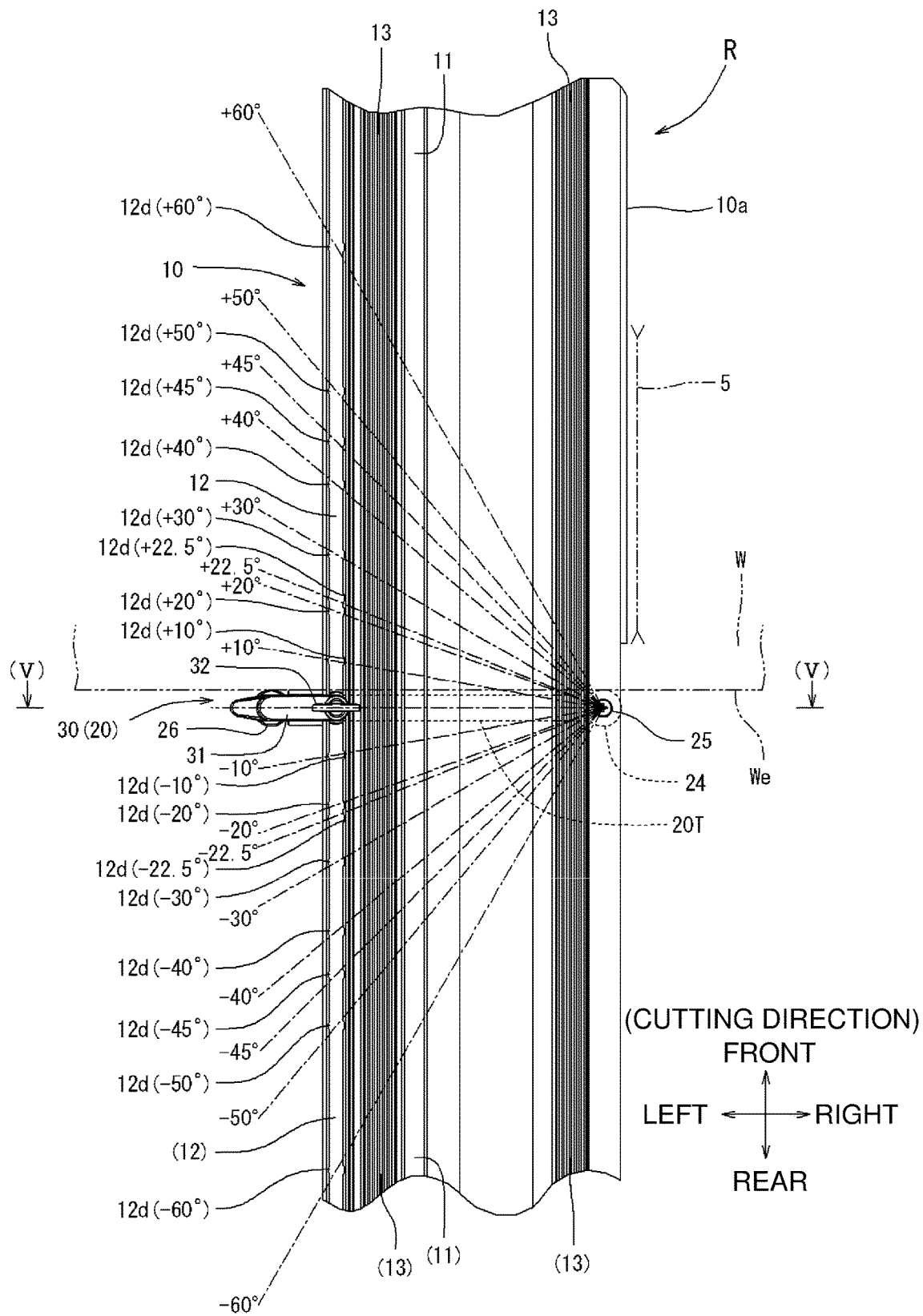
FIG. 2 is a plan view of the guide ruler showing a blade of the portable machining apparatus aligned along a right edge of the ruler body.
Figure 3:
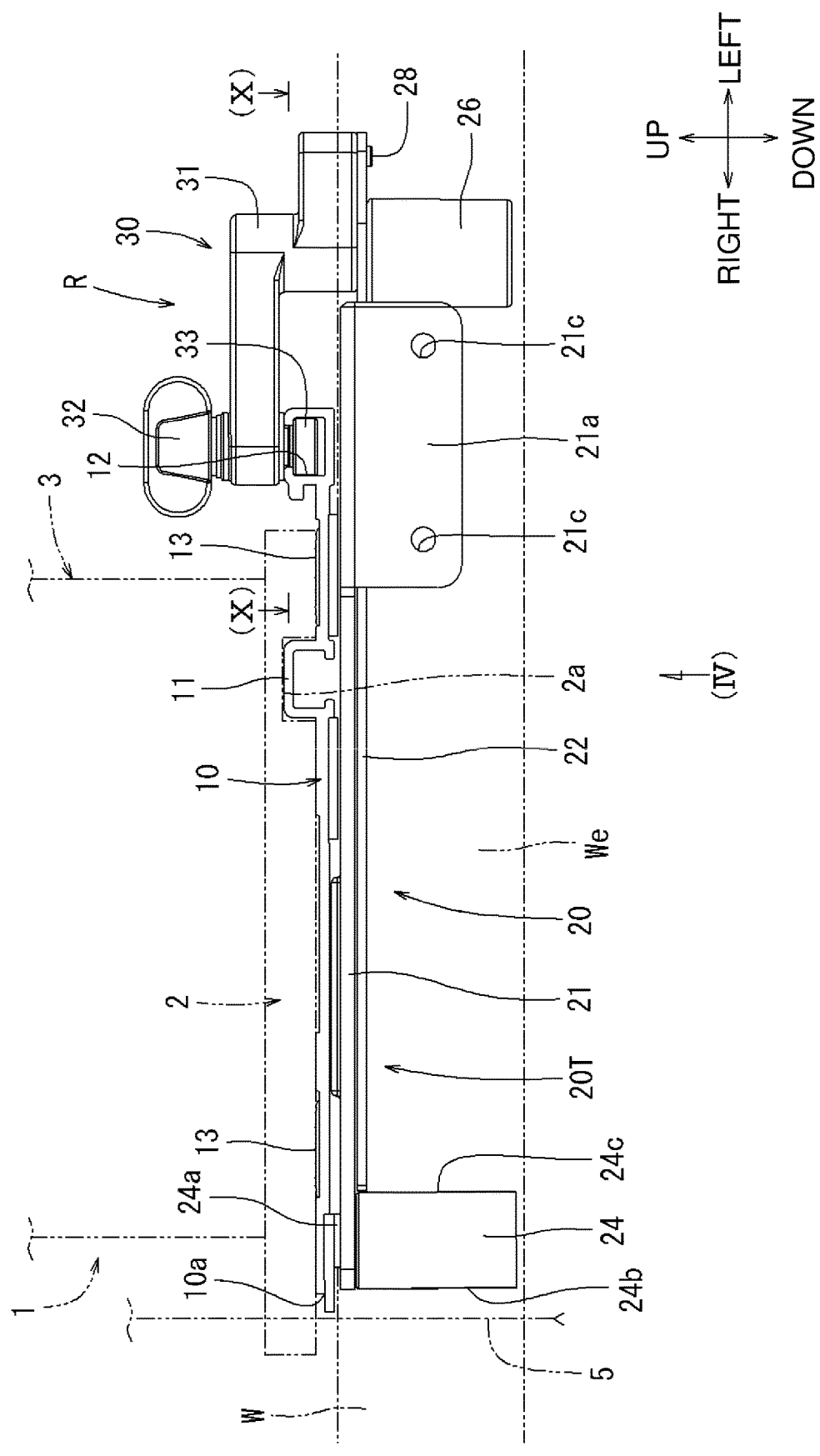
FIG. 3 is a front view of a positioner according to an embodiment.

As shown in FIGS. 1 to 3, the ruler body 10 has a guide rail 11 on its upper surface. The guide rail 11 guides the portable machining apparatus 1 in the front-rear direction. The guide rail 11 is formed integrally with the base by extrusion molding. The guide rail 11 is rectangular and protrudes upward. The guide rail 11 extends parallel to the right edge (guide edge 10*a*) of the ruler body 10 precisely at a predetermined distance from the right edge.

The ruler body 10 has a groove 12 on the upper surface, in addition to the guide rail 11. The groove 12 extends parallel to the guide rail 11 along the left edge of the ruler body 10. The groove 12 will be described in detail later. The ruler body 10 has two sliding sheets 13 applied on the upper surface. The sliding sheets 13 allow smooth sliding of the base 2 of the portable machining apparatus 1 placed on the ruler body 10. One sliding sheet 13 is applied along and between the guide rail 11 and the groove 12. The other sliding sheet 13 is applied along the right edge of the ruler body 10.

As shown in FIG. 1, the portable machining apparatus 1 is a hand-held power tool that includes a machining body 3 supported on the upper surface of the rectangular flat base 2. The operator moves the portable machining apparatus 1 frontward. As shown in FIG. 3, the base 2 has a guide groove 2*a* on the lower surface. The guide groove 2*a* receives the guide rail 11 on the ruler body 10. The guide groove 2*a* is formed across the base 2 from the front end to the rear end. The guide groove 2*a* is as wide as to receive the guide rail 11 without rattling.

The guide groove 2*a* on the base 2 receives the guide rail 11 to guide the blade 5 in the machining body 3 precisely along the guide edge 10*a* of the ruler body 10. For example, the guide edge 10*a* is aligned with a guideline drawn on the upper surface of the workpiece W. The operator moves the portable machining apparatus 1 on and along the ruler body 10 for precise cutting along the guideline.

The machining body 3 includes the circular blade 5 that rotates using an electric motor 4 as a power supply. The blade 5 is covered with a blade cover 6. On the left of the blade cover 6, a handle 7 gripped by the operator is located. On the left of the handle 7, two battery packs 8 are attached. The electric motor 4 operates using the two battery packs 8 as a power supply.

The ruler body 10 is set at a predetermined position relative to the workpiece W to guide the blade 5 in the portable machining apparatus 1 precisely along an intended cutting line (guideline). As shown in FIG. 1, the guide edge 10*a* is positioned obliquely rightward relative to the cut edge We of the workpiece W to cause the blade 5 to cut into the edge We obliquely rightward in the cutting operation. As shown in FIG. 2, the guide edge 10*a* positioned orthogonally to the cut edge We of the workpiece W causes the blade 5 to cut into the edge We at right angles in the cutting operation.

The positioner 20 positions the guide edge 10*a* mainly relative to the cut edge We of the workpiece W at any angle of inclination. The positioner 20 is located substantially on the lower surface of the ruler body 10. The positioner 20 according to the present embodiment is illustrated in detail in FIG. 3 and subsequent figures. The positioner 20 includes a first member 21 and a second member 22. The first member 21 and the second member 22 are elongated narrow plates. The first member 21 and the second member 22 have substantially the same width and length.

Figure 4:
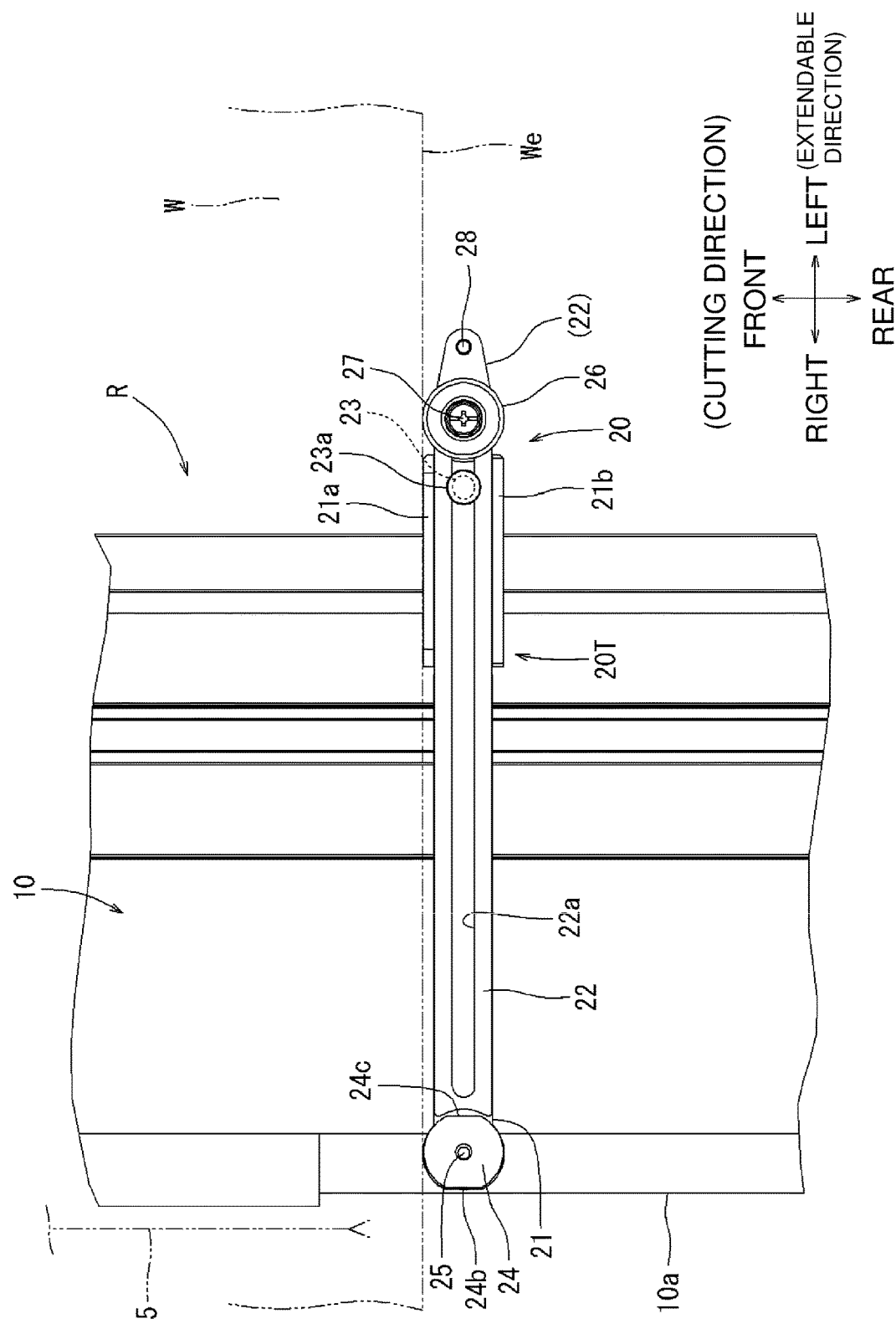
FIG. 4 is a bottom view of the positioner according to the embodiment as viewed in the direction indicated by arrow IV in FIG. 3.
Figure 5:
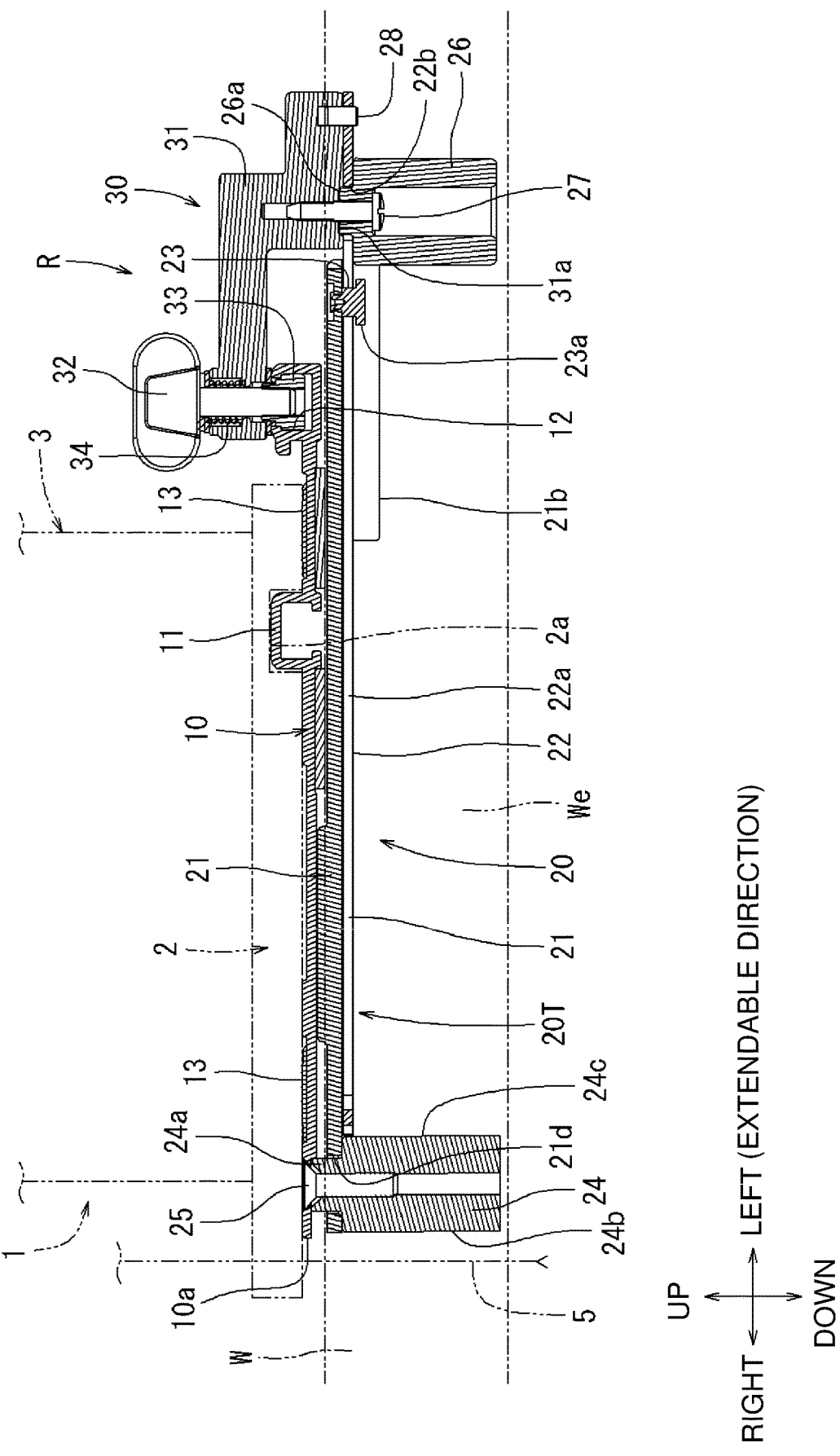
FIG. 5 is a cross-sectional view of the positioner according to the embodiment taken along line V-V in FIG. 2 as viewed in the direction indicated by arrows.
Figure 6:
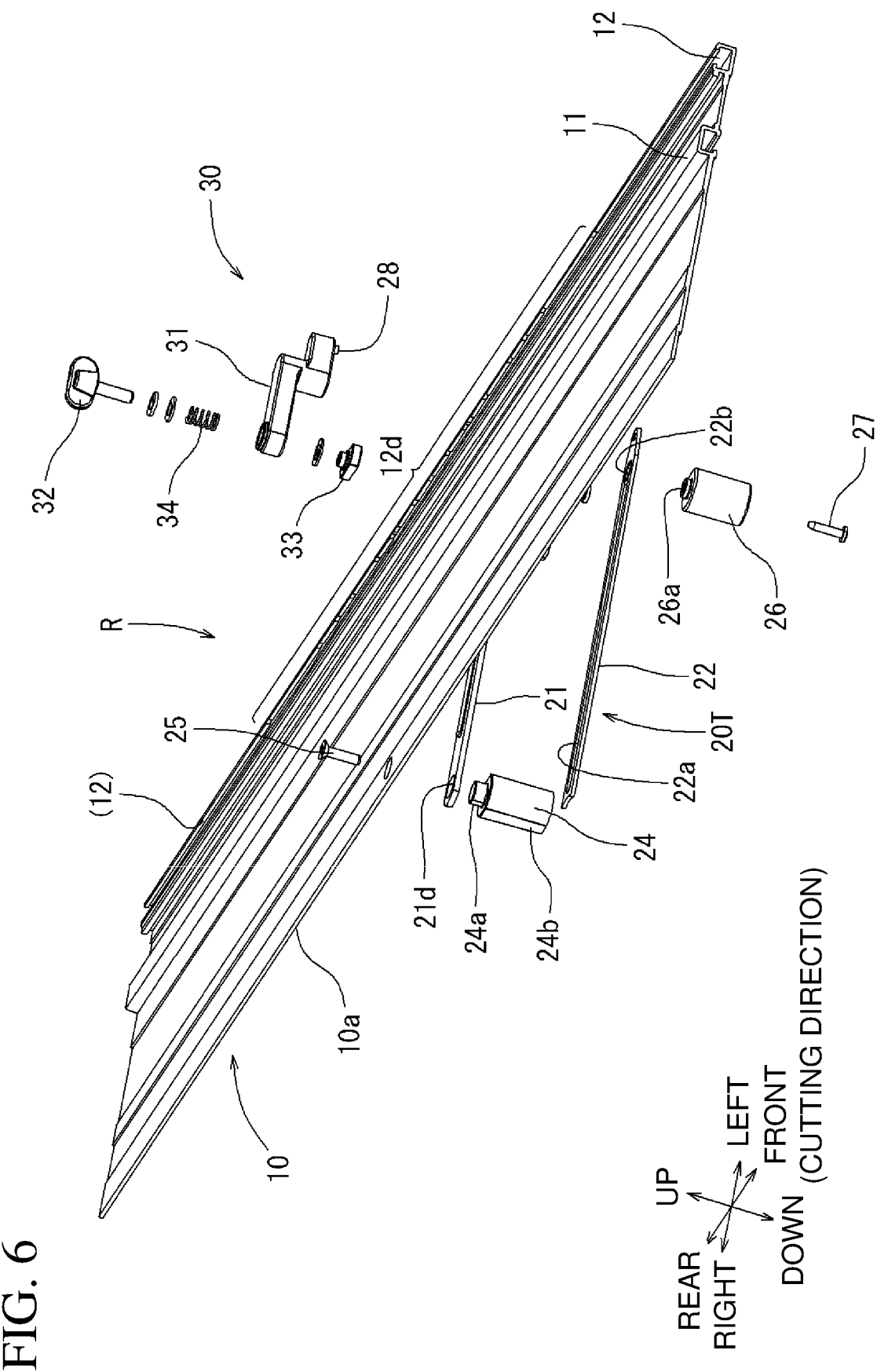
FIG. 6 is an exploded perspective view of the positioner according to the embodiment as viewed from the right, front, and above.
Figure 7:
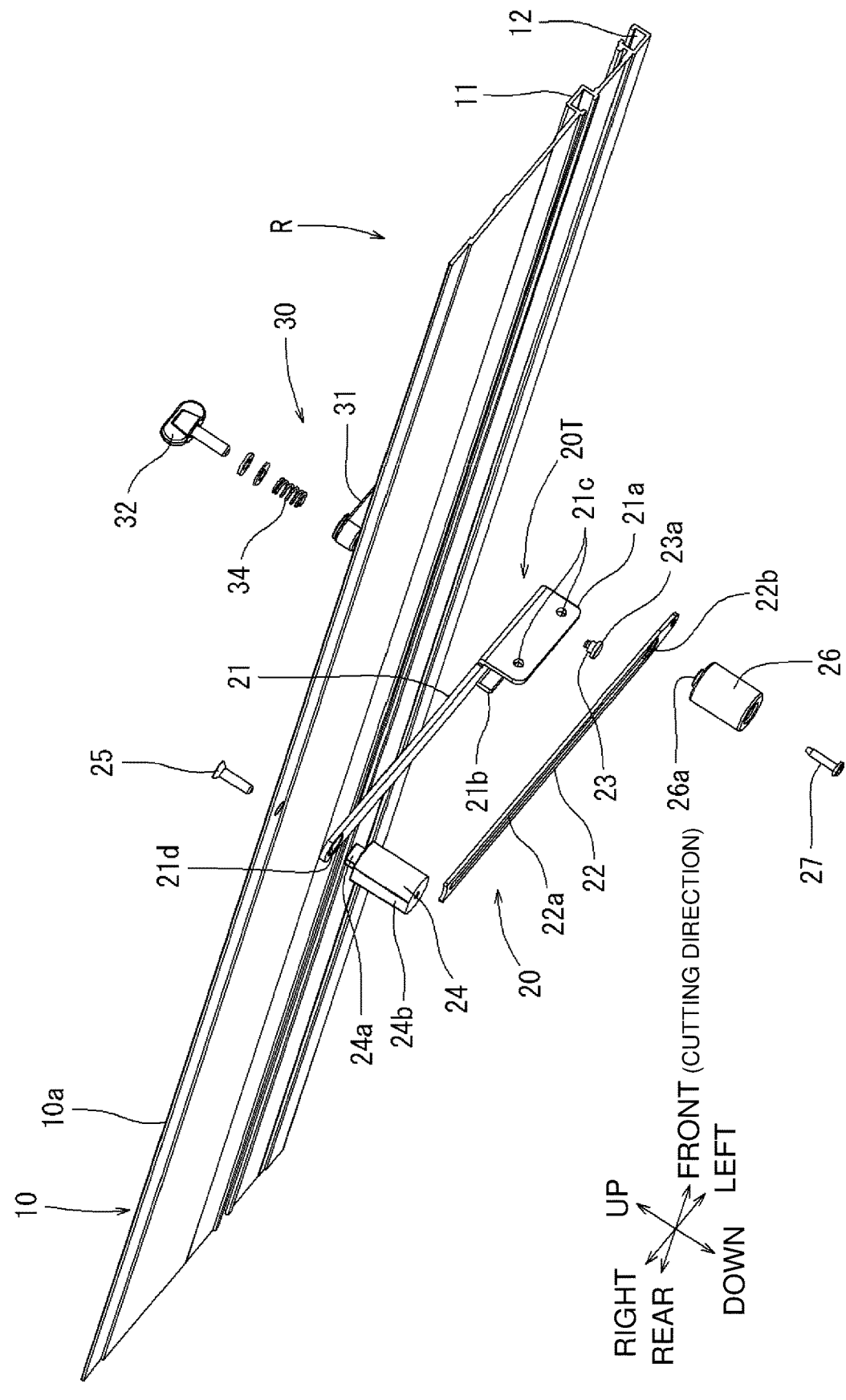
FIG. 7 is an exploded perspective view of the positioner according to the embodiment as viewed from the right, front, and below.
Figure 9:
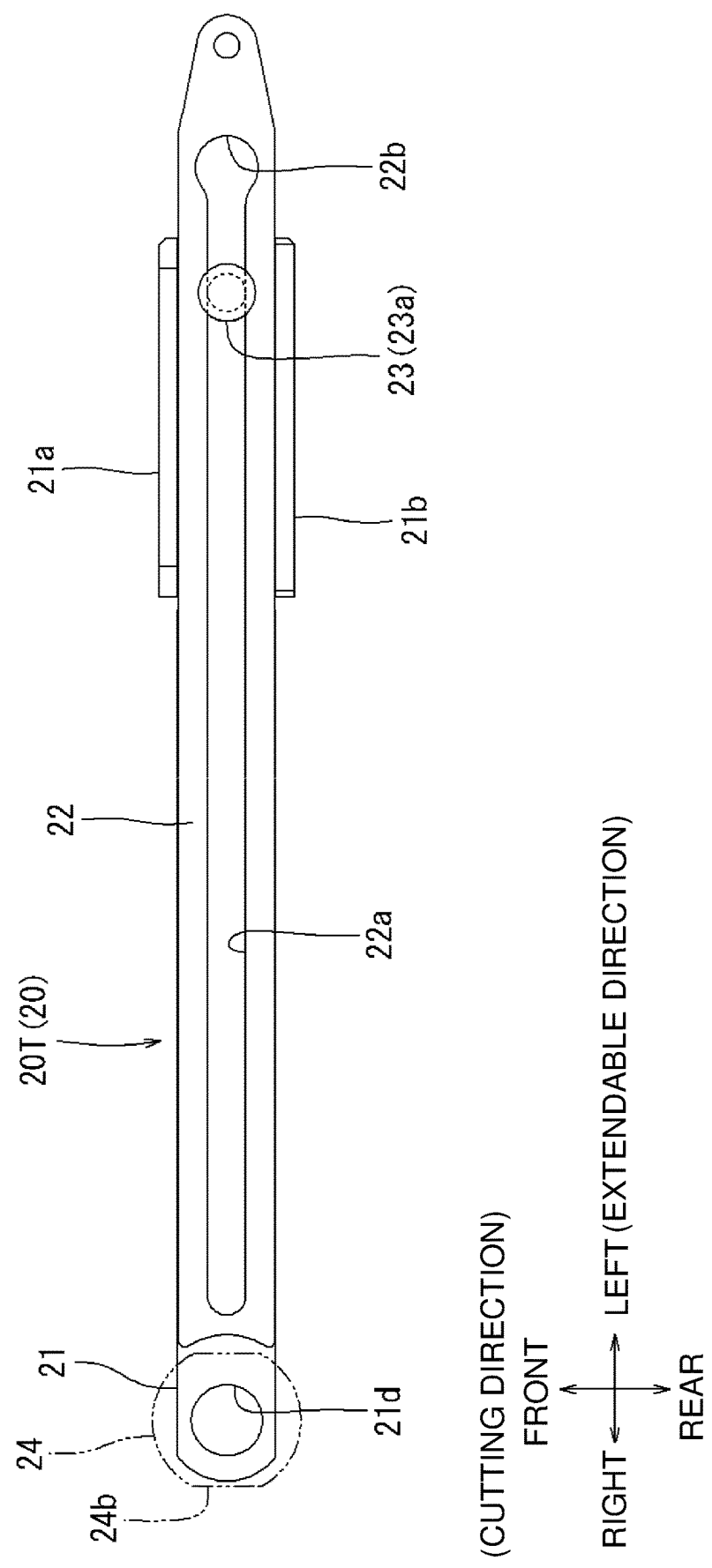

The first member 21 includes a pair of guide walls 21*a* and 21*b* on its left end. As shown in FIGS. 4 and 9, the pair of guide walls 21*a* and 21*b* extend downward and parallel to each other from the edges of the first member 21 in the width direction (front-rear direction). As shown in FIGS. 3 and 7, the front guide wall 21*a* extends downward farther than the rear guide wall 21*b*. The front guide wall 21*a* has two insertion-holes 21*c*, which are attachment holes for attaching an auxiliary attachment 35 described later.

As shown in FIGS. 4 and 9, the second member 22 located between the pair of front and rear guide walls 21*a* and 21*b* is supported in a manner undisplaceable relative to the first member 21 in the width direction and displaceable relative to the first member 21 in the longitudinal direction. The second member 22 has an elongated slot 22*a* extending in the longitudinal direction. The elongated slot 22*a* extends to near the right end of the second member 22. The elongated slot 22*a* has, on the left end, a circular wider portion 22*b* with a greater width.

The first member 21 has a guide protrusion 23 attached to the left end and between the pair of guide walls 21*a* and 21*b*. The guide protrusion 23 is a rivet attached to the first member 21 with a clinched end. The guide protrusion 23 protrudes downward. The guide protrusion 23 is placed in the elongated slot 22*a*. The guide protrusion 23 has, on its bottom, a circular flange 23*a* extending radially. The flange 23*a* has a diameter larger than the width of the elongated slot 22*a* and smaller than the inner diameter of the wider portion 22*b*. To assemble the first member 21 and the second member 22 together, the flange 23a is placed through the wider portion 22b, and the guide protrusion 23 is moved into the elongated slot 22a. To disassemble the first member 21 and the second member 22 apart, the reversed procedure is taken, or the guide protrusion 23 is removed from the elongated slot 22a.

After the first member 21 and the second member 22 are assembled together, the guide protrusion 23 is displaceable in and relative to the elongated slot 22a, and is unremovable from the elongated slot 22a as its disengagement is restricted by the flange 23a. With the guide protrusion 23 engaged in the elongated slot 22a, the first member 21 and the second member 22 are connected together in a manner displaceable relative to each other in the longitudinal direction and are undisplaceable in the plate thickness direction. With the guide protrusion 23 placed through the elongated slot 22a in addition to being placed between the pair of guide walls 21a and 21b, the second member 22 is supported in a manner slidable relative to the first member 21 in the longitudinal direction and is unremovable in the plate thickness direction.

With the guide protrusion 23 located between the pair of guide walls 21a and 21b through the elongated slot 22a, the two slide guides are aligned in the longitudinal direction. The aligned two slide guides maximize the length by which the first member 21 and the second member 22 can slide along each other (the length by which a contact member 20T described later can extend).

The first member 21 and the second member 22 are connected in a manner longitudinally slidable relative to each other to form the contact member 20T. The front guide wall 21a of the first member 21 is placed in contact with the cut edge We of the workpiece W, positioning the ruler body 10 relative to the workpiece W.

The contact member 20T is supported in a manner rotatable on the lower surface of the ruler body 10. More specifically, the first member 21 has the right end connected to a right edge portion of the ruler body 10 in a rotatable manner. The first member 21 has a circular support hole 21d on the right end. The support hole 21d receives a boss 24a of a cylindrical contact part 24 in an axially rotatable manner. A fixing screw 25 is screwed into the boss 24a, fastening the contact part (support) 24 onto the lower surface of the ruler body 10. The first member 21 is rotatable about the boss 24a on the lower surface of the ruler body 10.

The contact part 24 is placed in contact with the cut edge We of the workpiece W. The contact part 24 is formed from a synthetic resin to avoid scratches on the workpiece W. As shown in FIG. 4, the contact part 24 has a curved surface to be in contact with the workpiece W. The contact part 24 has flat surfaces 24b and 24c on its right and left. The right flat surface 24b serves as a relief for avoiding interference with the blade 5 while maintaining the thickness (rigidity) of the contact part 24. The right and left flat surfaces 24b and 24c increase flexibility in the assembling direction in which the contact part 24 is screwed to the ruler body 10.

The second member 22 also has a cylindrical contact part 26 on the left end, similarly to having the contact part 24 on the right end. The left contact part 26 also has an upper boss 26a. The boss 26a is placed through the wider portion 22b located on the left end of the elongated slot 22a in the second member 22, and connected to a retention arm 31 included in a position retainer 30.

The position retainer 30 locks the contact member 20T at the rotational position about the right end (boss 24a). The position retainer 30 extends from the left end of the contact member 20T to over the upper surface of the ruler body 10. The position retainer 30 includes the retention arm 31, a thumbscrew 32, and a locking member 33. The retention arm 31 is connected to the left end of the second member 22. The thumbscrew 32 is held at the distal end of the retention arm 31. The thumbscrew 32 is screwed into the locking member 33.

The second member 22 has the left end constantly protruding leftward from the left edge of the ruler body 10. The retention arm 31 is connected to the upper surface of the protruded left end. The retention arm 31 has, on the lower surface, a circular recess 31a receiving an upper portion of the boss 26a. With the boss 26a placed through the wider portion 22b in the second member 22 from below to have the upper portion of the boss 26a received in the recess 31a, a fixing screw 27 is screwed into the lower surface of the retention arm 31. This fastens the contact part 26 and the retention arm 31 together to the second member 22.

Leftward from the fixing screw 27 being screwed, an engagement pin 28 is driven into the second member 22 and the lower surface of the retention arm 31. The engagement pin 28 prevents the retention arm 31 from rotating about the fixing screw 27 being screwed. The distal end of the retention arm 31 extends over the left edge of the ruler body 10. As shown in FIGS. 5, 6, 12, and 13, the retention arm 31 holds the thumbscrew 32 on the distal end. The thumbscrew 32 protrudes from the lower surface of the retention arm 31. The thumbscrew 32 is supported in a manner rotatable relative to the distal end of the retention arm 31 and displaceable along its shaft. The thumbscrew 32 is supported on the retention arm 31 with a compression spring 34 in between. The compression spring 34 urges the thumbscrew 32 upward. The locking member 33 is fastened to a lower portion of the thumbscrew 32 with thread engagement.

The groove 12 on the ruler body 10 extends below the distal end of the retention arm 31. The groove 12 extends across the entire length of the left edge of the ruler body 10 from the front end to the rear end. The groove 12 is parallel to the guide rail 11. The groove 12 is open upward across the entire length in the front-rear direction. For example, the groove 12 guides an assist tool to slide in the front-rear direction to prevent lifting of the base 2 during machining. Similarly to the guide rail 11, the groove 12 is formed integrally with the guide rail 11 by extrusion molding.

Figure 10:
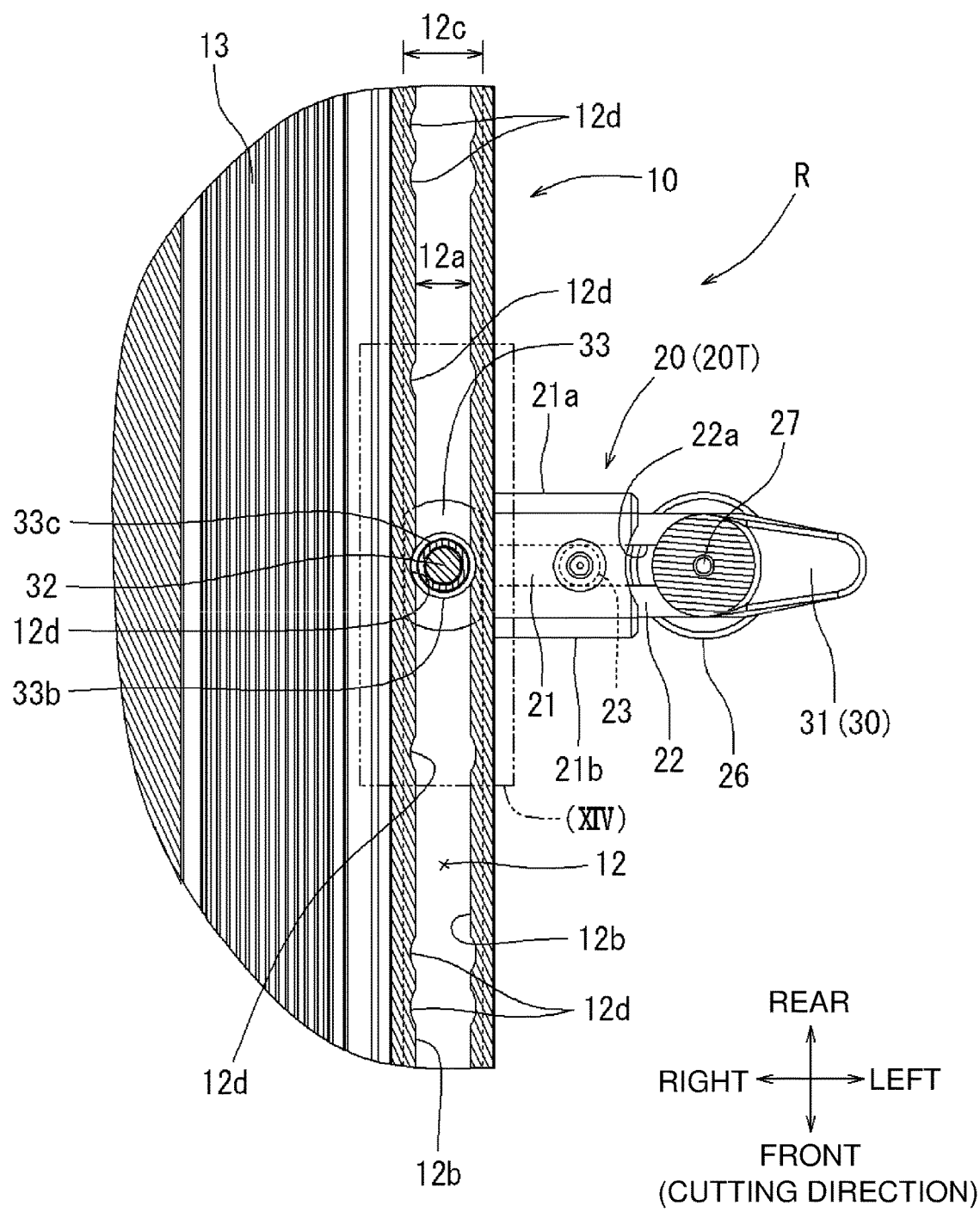
FIG. 10 is a cross-sectional view of a position retainer taken along line X-X in FIG. 3 as viewed in the direction indicated by arrows, showing a locking member engaged with an orthogonal positioning unit on a groove.
Figure 12:
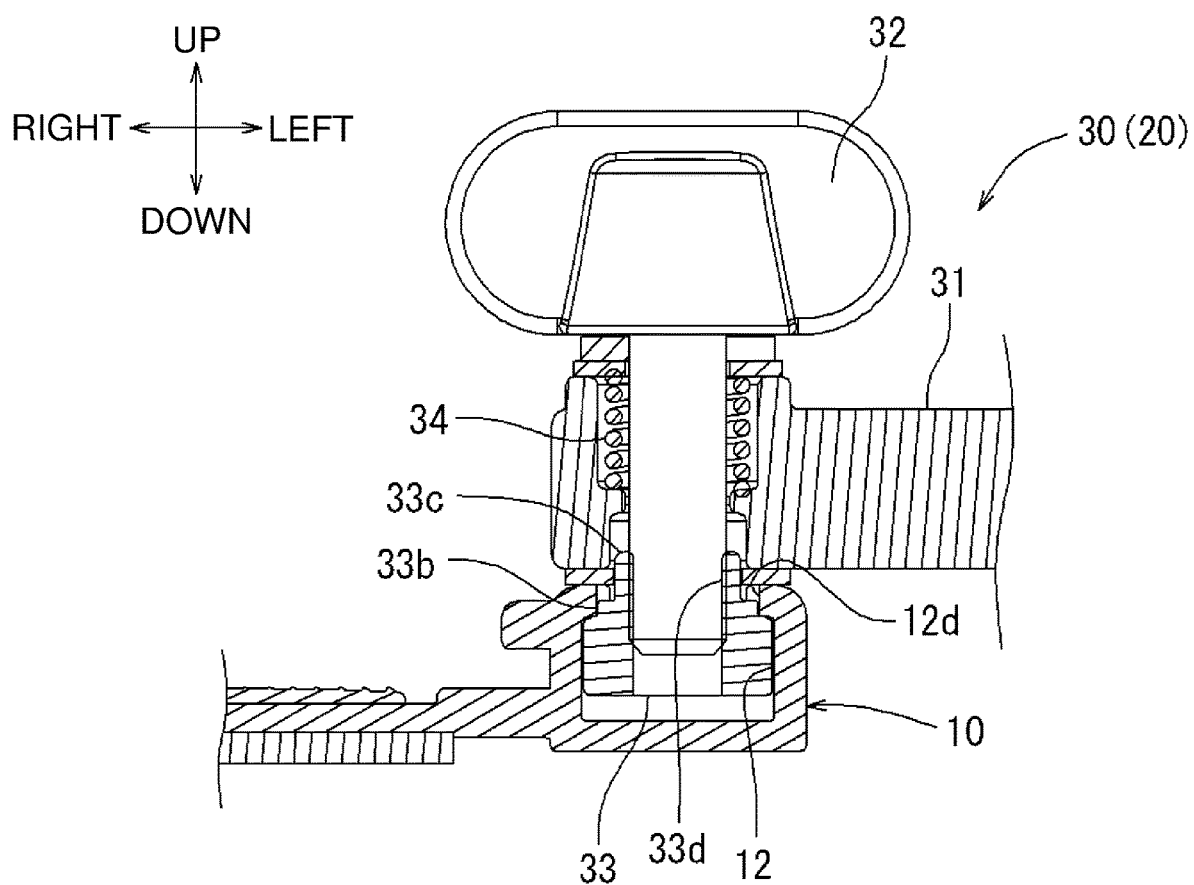
FIG. 12 is an enlarged view of the position retainer in a nonoperational state with a thumbscrew allowed to move upward, in which a positioning operation is disabled.
Figure 13:
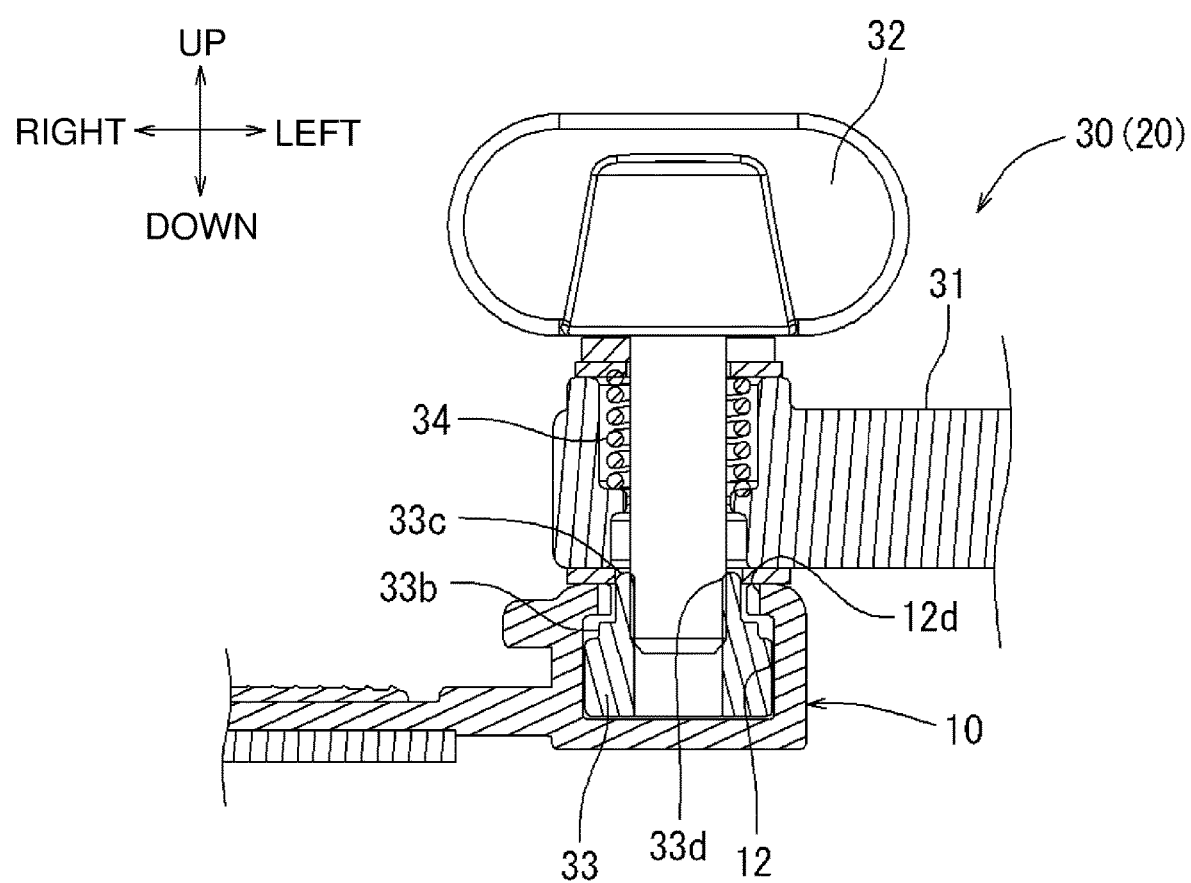
FIG. 13 is an enlarged view of the position retainer in an operational state with the thumbscrew pressed downward, in which a positioning operation is enabled.
Figure 14:
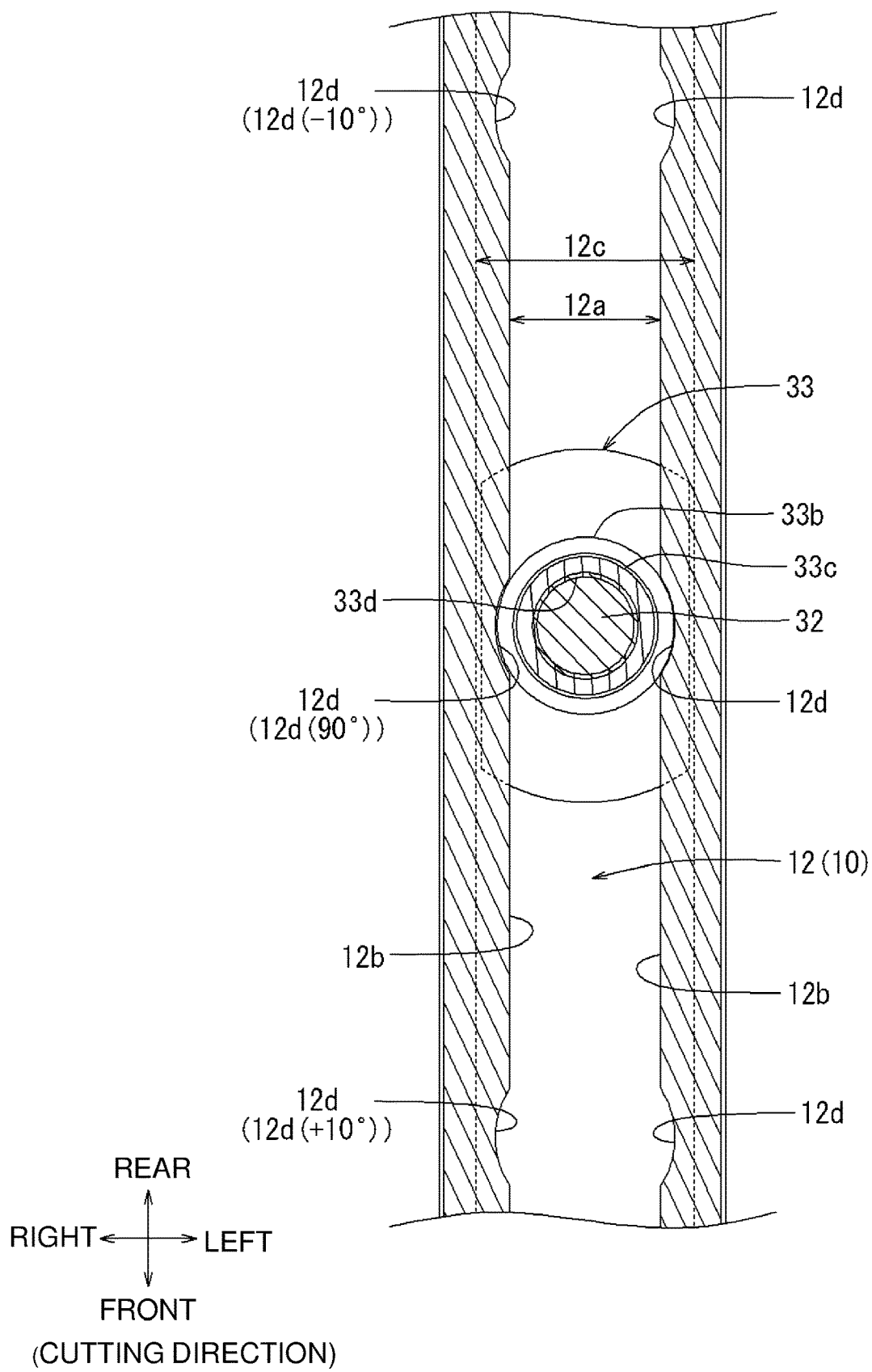
FIG. 14 is an enlarged view of portion XIV in FIG. 10.

As shown in FIGS. 10 and 14, the groove 12 has an opening width 12a narrowed by opening edges 12b protruding toward each other across the opening width. The opening width 12a is thus narrower than the groove width 12c. The groove 12 accommodates the locking member 33. As shown in FIGS. 10 to 14, the thumbscrew 32 is screwed into the upper surface of the locking member 33. As shown in FIG. 13, when the thumbscrew 32 is pressed downward against the urging force from the compression spring 34, the locking member 33 is displaced downward (to a deeper position in the groove 12) together with the thumbscrew 32 within the groove 12. The locking member 33 is pressed until coming in contact with the bottom of the groove 12. As shown in FIG. 12, without the thumbscrew 32 pressed, the compression spring 34 urges the thumbscrew 32 upward (at a shallower position in the groove 12), and the locking member 33 is pressed against the right and left opening edges 12b.

Figure 11:
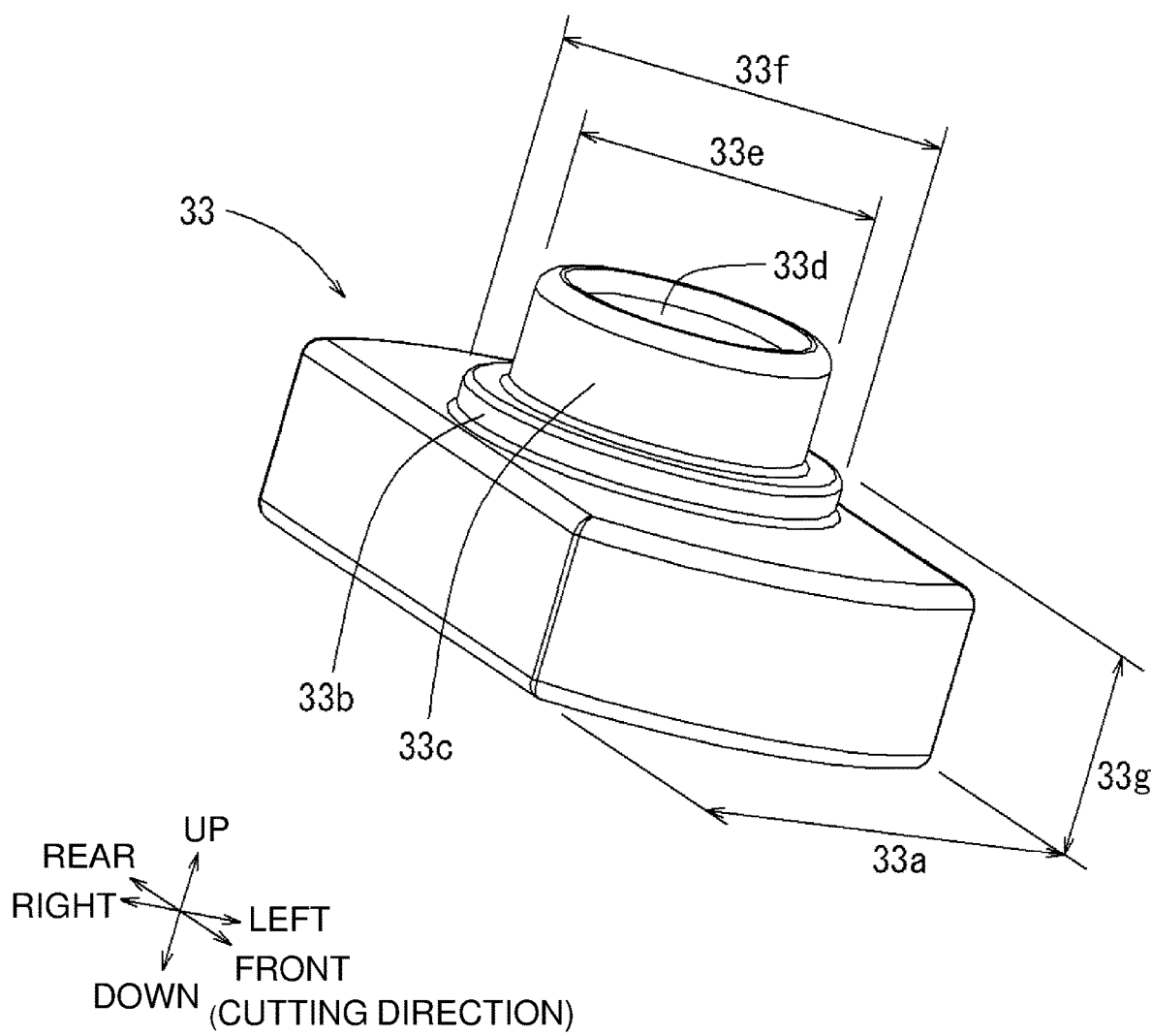
FIG. 11 is an enlarged perspective view of the locking member.

As shown in FIG. 11, the locking member 33 has a lateral width 33a smaller than the groove width 12c of the groove 12 and larger than the opening width 12a. The locking member 33 integrally has a circular engagement step 33b in the middle of its upper surface. The locking member 33 also has a cylindrical part 33c for thread engagement in the middle of the upper surface of the engagement step 33b. The cylindrical part 33c has an internal screw hole 33d into which the thumbscrew 32 is screwed. The locking member 33 has a portion with a height 33g from its lower surface to the upper surface of the engagement step 33b. The height 33g is defined to allow the portion to be below the opening edges 12b in the groove 12.

The engagement step 33b has an outer diameter 33f larger than the opening width 12a. The cylindrical part 33c has an outer diameter 33e smaller than the opening width 12a. The cylindrical part 33c thus constantly protrudes upward from between the facing opening edges 12b, whereas the engagement step 33b remains below the opening edges 12b except the engagement recesses 12d (described below).

As shown in FIGS. 10 and 14, the opening edges 12b of the groove 12 have pairs of arc-shaped engagement recesses 12d. Each pair of engagement recesses 12d laterally face each other on the laterally facing opening edges 12b. The engagement step 33b can enter between any two laterally facing engagement recesses 12d from below. With the locking member 33 displaced upward in the groove 12 and the engagement step 33b entering between the engagement recesses 12d, the locking member 33 is immovably positioned in the front-rear direction. The pairs of laterally facing engagement recesses 12d thus function as positioning units (detents) that set the locking member 33 at intermittent predetermined positions in the longitudinal direction (front-rear direction) of the ruler body 10.

As shown in FIG. 12, when the thumbscrew 32 is allowed to move to an upper nonoperational position under the urging force from the compression spring 34, the locking member 33 is displaced upward in the groove 12 and causes the engagement step 33b to enter between the engagement recesses 12d. Without the thumbscrew 32 pressed downward, the engagement step 33b is held between the engagement recesses 12d under the urging force from the compression spring 34. This sets the contact member 20T at the rotational position. In this positioning disabled state, the thumbscrew 32 is tightened to lock the engagement step 33b between the engagement recesses 12d, thus locking the locking member 33 as positioned. The locking member 33 locked as positioned in the front-rear direction locks the contact member 20T at the rotational position.

As shown in FIG. 13, when the thumbscrew 32 is pressed downward against the urging force from the compression spring 34, the engagement step 33b is disengaged downward from the engagement recesses 12d. With the engagement step 33b disengaged from the engagement recesses 12d, the locking member 33 is movable frontward or rearward along the groove 12 by any distance (positioning enabled state). With the thumbscrew 32 moved frontward or rearward while being pressed downward, the locking member 33 is movable along the groove 12. This allows the contact member 20T to move to any rotational position. As moved to different rotational positions, the contact member 20T extends and contracts automatically. The groove 12 has detents to allow the locking member 33 to be set at multiple positions. The detents setting the locking member 33 at a predetermined position can quickly set the contact member 20T at the rotational position (at an angle) with high repeatability.

The pairs of facing engagement recesses 12d are arranged along the groove 12 in the longitudinal direction. Any pair of arc-shaped facing engagement recesses 12d are hereafter simply referred to as a positioning unit 12d. In FIGS. 2 and 10, the engagement step 33b in the locking member 33 enters the positioning unit 12d located left to the fixing screw 25, which is the center of rotation of the positioner 20. When the engagement step 33b is in the positioning unit 12d at this position and locks the locking member 33, the contact member 20T extends at right angles with the guide edge 10a as shown in FIGS. 2, 4, and 10, allowing the blade 5 to cut into the workpiece W at the edge We at right angles. The positioning unit 12d for positioning the contact member 20T at right angles with the guide edge 10a is hereafter referred to as an orthogonal positioning unit 12d (90°).

The multiple positioning units 12d arranged longitudinally along the groove 12 allow the locking member 33 to be set at different positions. Thus, the contact member 20T can be positioned at different angles of inclination (rotational position) with the guide edge 10a, in addition to being set at the orthogonal position. The contact member 20T is set at different rotational positions by the detents, quickly positioning the ruler body 10 relative to the workpiece W with high repeatability.

In the present embodiment, as shown in FIG. 2, the same eight positioning units 12d are arranged frontward and rearward from the orthogonal positioning unit 12d (90°). The positioning units 12d frontward and rearward from the orthogonal positioning unit 12d) (90° include oblique positioning units 12d for positioning at ±10°, ±20°, ±22.5°, ±30°, ±40°, ±45°, ±50°, and ±60° arranged in this order. In FIG. 2, each angle of inclination is indicated in parentheses following the reference numeral 12d. In FIG. 2, each angle of inclination is also shown with a dot-and-dash line extending toward the corresponding oblique positioning unit 12d from the fixing screw 25, serving as the center of rotation of the contact member 20T. As the contact member 20T rotates while extending its length, the engagement step 33b is fitted in an oblique positioning unit 12d under the urging force from the compression spring 34. This sets the contact member 20T at the rotational position. The contact member 20T in the present embodiment can be quickly set at the orthogonal position or at one of the 16 rotational positions indicated by the dot-and-dash lines labeled with inclination angles with high repeatability.

The thumbscrew 32 may be tightened at any position other than the illustrated 16 positioning units 12d. In this case, the engagement step 33b is pressed against the lower surface of the opening edges 12b and locks the locking member 33 as positioned. Thus, the thumbscrew 32 may be tightened to lock the locking member 33 at any rotational position other than the illustrated 16 rotational positions. This allows the contact member 20T to be locked at any rotational position.

Figure 8:
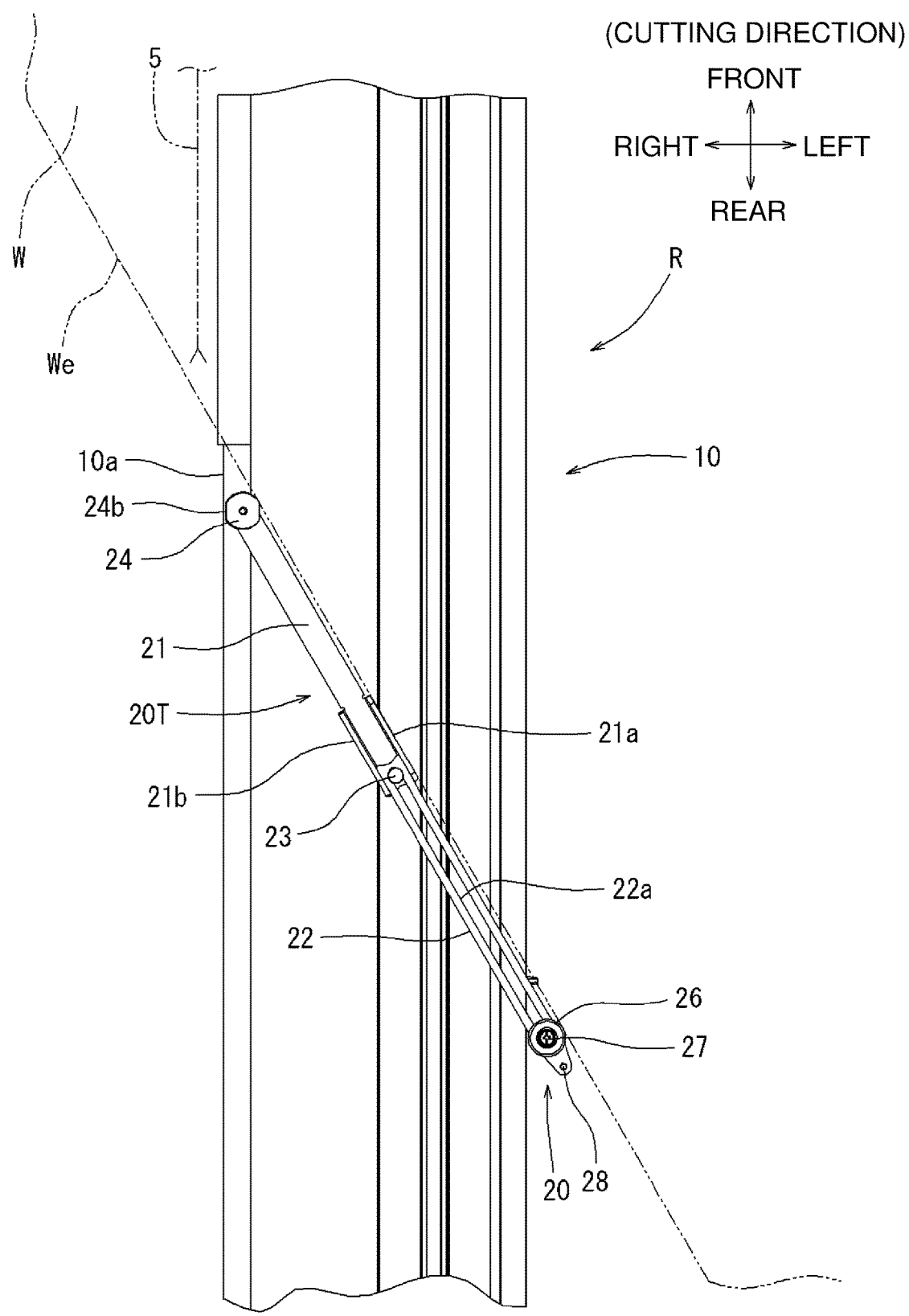
FIG. 8 is a bottom view corresponding to FIG. 1, showing the bottom of the positioner extended to guide the ruler body obliquely to the edge of the workpiece.

In FIG. 1, the ruler body 10 is positioned with the locking member 33 engaged in the oblique positioning unit 12d (−30° to lock the contact member 20T at a position that is 30° rearward from the orthogonal position. In this case, the blade 5 cuts into the workpiece W at the edge We in a direction inclined rightward by 30°. In FIG. 8, the locking member 33 is engaged in the oblique positioning unit 12d (−60°) to position and lock the contact member 20T at a position that is 60° rearward from the orthogonal position. When the ruler body 10 is positioned with the contact member 20T set at the rotational position shown in FIG. 8, the blade 5 cuts into the workpiece W at the edge We in a direction inclined rightward by 60° from the orthogonal position.

Figure 15:
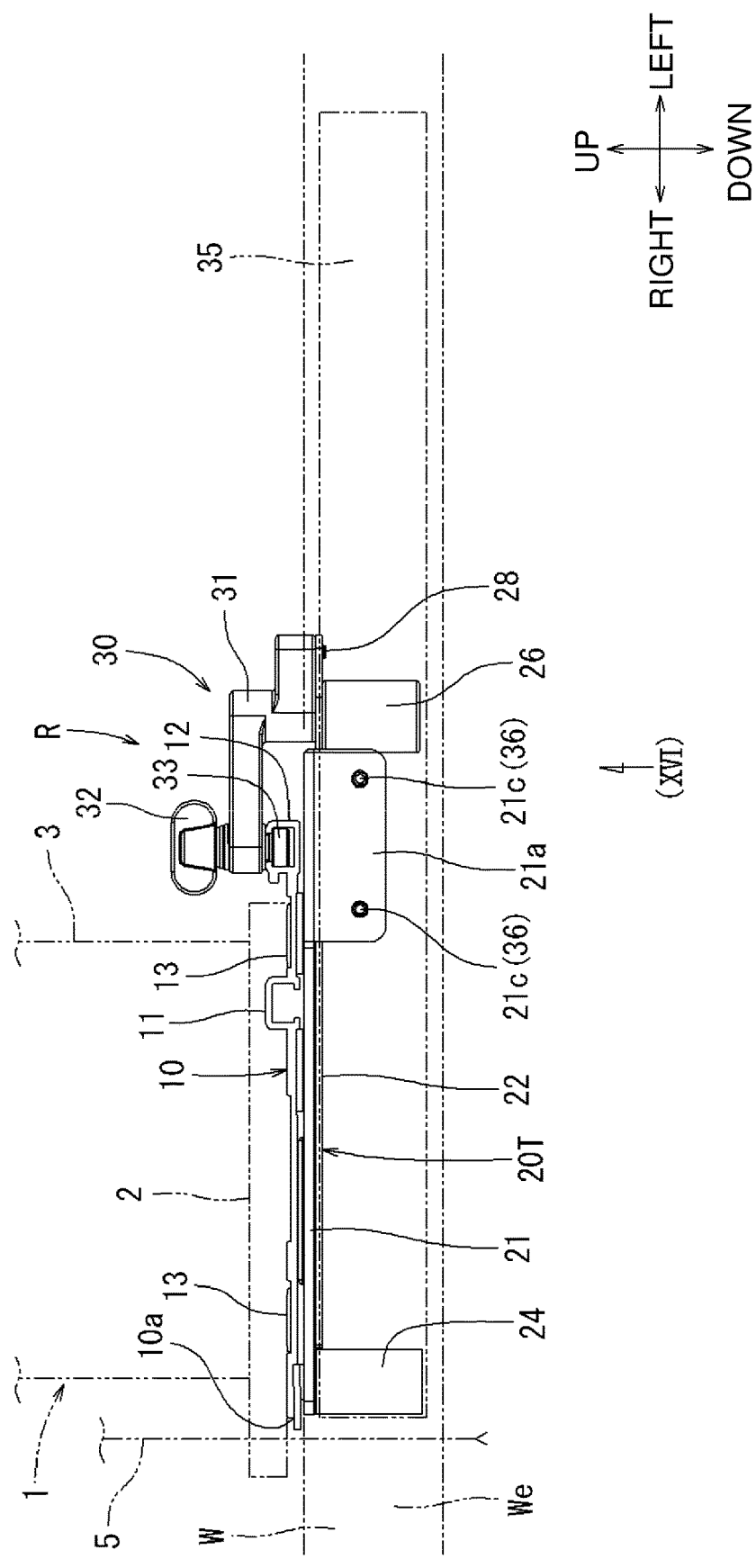
FIG. 15 is a front view of the positioner to which an auxiliary attachment is attached.
Figure 16:
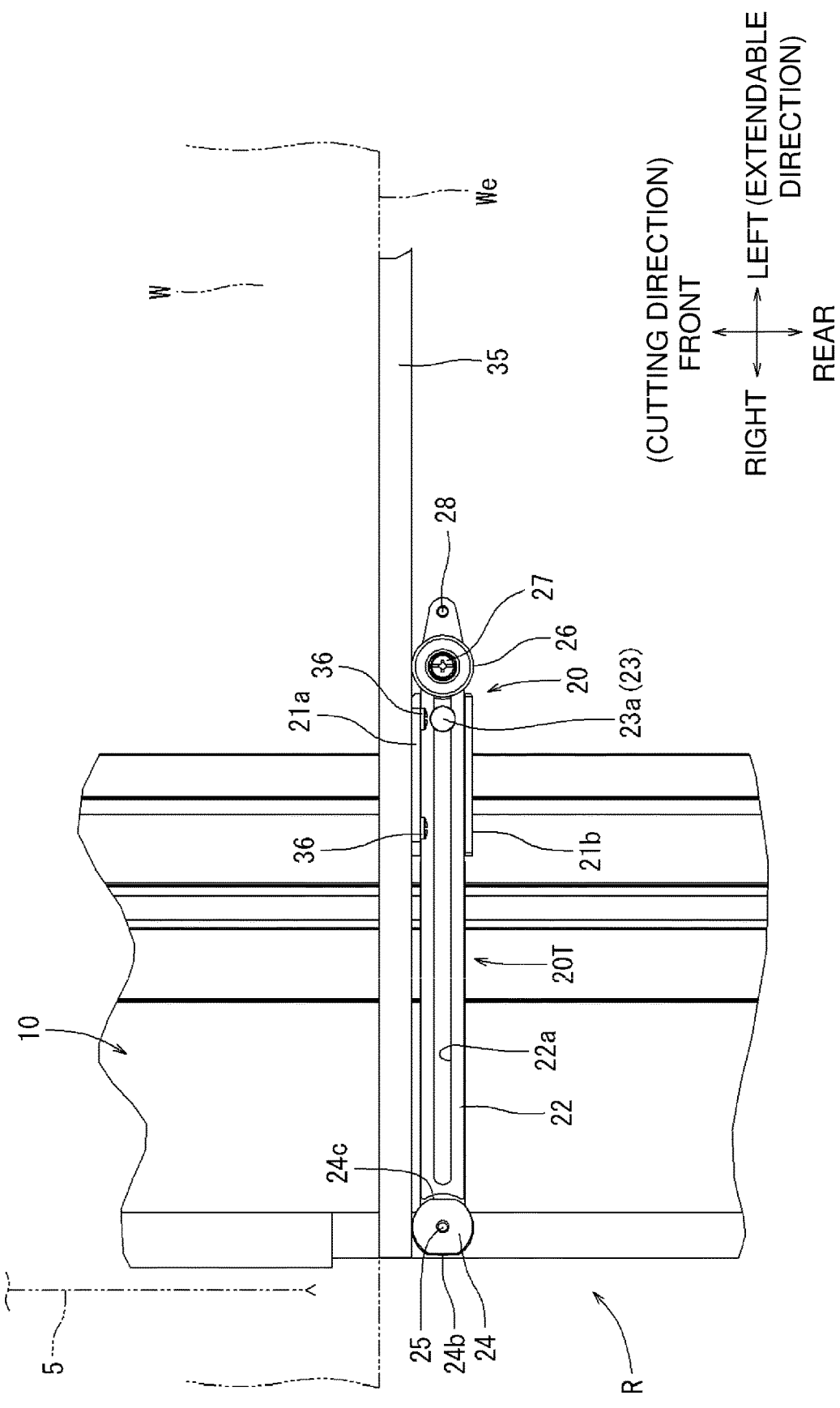
FIG. 16 is a bottom view of the positioner to which the auxiliary attachment is attached as viewed in the direction indicated by arrow XVI in FIG. 15, showing the ruler body guided at right angles with the edge of the workpiece.
Figure 17:
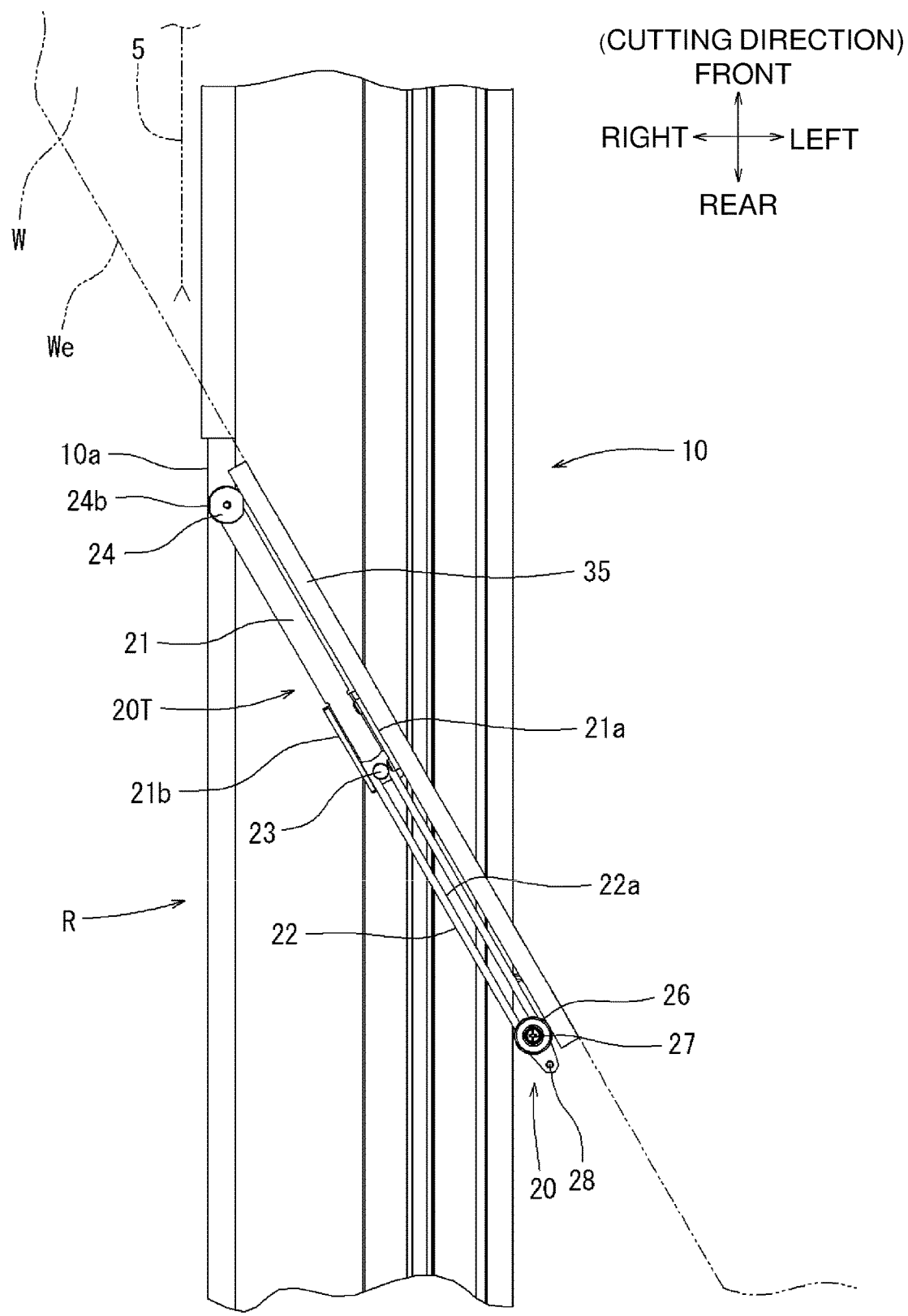
FIG. 17 is a bottom view of the positioner to which the auxiliary attachment is attached, showing the ruler body guided obliquely rightward relative to the edge of the workpiece.

As shown in FIGS. 15 to 17, the auxiliary attachment 35 may be attached to the contact member 20T. The auxiliary attachment 35 is an elongated rectangular block. The auxiliary attachment 35 according to the present embodiment is attachable to the guide wall 21a. The guide wall 21a has two insertion holes 21c, which receive wood screws 36 having sharp tips. The wood screws 36 are screwed while tapping, with the tip, internal threads on the auxiliary attachment 35. This fastens the auxiliary attachment 35 to the guide wall 21a with thread engagement.

The auxiliary attachment 35 extends between the right and left contact parts 24 and 26. The auxiliary attachment 35 is placed along and in contact with the cut edge We of the workpiece W, instead of the contact parts 24 and 26. As shown in FIG. 17, the auxiliary attachment 35 has a length covering the longest length of the contact member 20T between the contact parts 24 and 26.

In FIGS. 3, 4, and 8, the contact parts 24 and 26 are directly placed in contact with the cut edge We of the workpiece W without the auxiliary attachment 35. In FIGS. 15, 16, and 17, corresponding respectively to FIGS. 3, 4, and 8, the auxiliary attachment 35 is attached and placed in contact with the cut edge We. As shown in FIG. 15, the auxiliary attachment 35 is placed along and in contact with the cut edge We. As shown in FIG. 16, when the positioner 20 is set at the orthogonal cutting position (the position at which the blade 5 cuts into the edge We at right angles), the auxiliary attachment 35 is placed along and in contact with the cut edge We. As shown in FIG. 17, when the positioner 20 is set at an oblique cutting position that is 60° rearward (where the blade 5 cuts into the cut edge We in a direction inclined rightward by 60°), the auxiliary attachment 35 is also placed along and in contact with the entire length of the cut edge We.

The auxiliary attachment 35 is in surface contact with the cut edge We of the workpiece W, thus positioning the ruler body 10 more stably relative to the workpiece W.

The guide ruler R according to the present embodiment includes the positioner 20 that is rotatable and also extendable while rotating. The contact member 20T does not greatly protrude from the edge of the ruler body 10 at any rotational position, thus avoiding interference with the operation.

The contact member 20T is locked at any rotational position by the position retainer 30 located opposite to the center of rotation. The ruler body 10 is thus reliably retained at the set position relative to the workpiece W without being displaced from the locked position or unstably retained at the locked position, unlike known gauges.

The extendable contact member 20T has a telescopic structure including the first member 21 and the second member 22 connected in a manner longitudinally displaceable relative to each other. The contact member 20T thus extends and contracts reliably with a simple structure.

The contact member 20T has one end moved along the groove 12 to rotate on the lower surface of the ruler body 10. The contact member 20T automatically extends and contracts while rotating. The positioner 20 thus has high operability.

The position retainer 30 is located over the upper surface of the ruler body 10 to lock the contact member 20T at the set position (rotational position). The positioner 20 thus has high operability.

The second member 22 is guided by the pair of guide walls 21a and 21b on the first member 21. The guide protrusion 23 on the first member 21 is guided along the elongated slot 22a in the second member 22. This allows smooth displacement of the first member 21 and the second member 22 relative to each other in the longitudinal direction, thus allowing the contact member 20T to extend and contract smoothly while rotating.

The guide protrusion 23 is located between the pair of guide walls 21a and 21b in the longitudinal direction of the contact member 20T. The guide walls 21a and 21b as a guide and the guide protrusion 23 as a guide are aligned in the longitudinal direction. The two guides can thus guide each other, and also can have a larger extendable length.

The elongated slot 22a guiding the guide protrusion 23 on the first member 21 has a keyhole-shaped wider portion 22b at one end. This allows removal of the guide protrusion 23, which includes the flange 23a for restricting disengagement of the guide protrusion 23 from the elongated slot 22a, by pulling out the flange 23a through the wider portion 22b, without detaching the guide protrusion 23 from the first member 21. The first member 21 and the second member 22 can thus be easily disassembled apart and assembled together, allowing easier assembling and maintenance of the positioner 20.

The contact member 20T has the contact part 26 to be in contact with the cut edge We of the workpiece W at an end opposite to its center of rotation (contact part 24) relative to the ruler body 10, with the guide protrusion 23 in between. The contact part 26 is to be in contact with the cut edge We of the workpiece W across a large distance from the center of rotation, thus more stably positioning the ruler body 10 relative to the workpiece W.

The groove 12 on the ruler body 10 simplifies the position retainer 30. The position retainer 30 has multiple detents on the groove 12 as the positioning units 12d for restricting the movement of the locking member 33 along the groove 12. This allows the contact member 20T to be quickly set at the rotational position with high repeatability.

In the present embodiment, when the right and left cylindrical contact parts 24 and 26 are in contact with the cut edge We without the auxiliary attachment 35, the contact member 20T is in line contact with the cut edge We on the two right and left contact parts. The structure allows stabler contact than a point contact. Also, the contact parts 24 and 26 are cylindrical and have high rigidity.

The auxiliary attachment 35 is attached to the contact member 20T to avoid scratches on the cut edge We of the workpiece W and achieve more reliable and stabler contact. The auxiliary attachment 35 can be easily attached to and detached from the guide wall 21a with screws. Also, the positioner 20 can be simple and compact.

The embodiment described above may be modified variously. In the above example, the extendable contact member 20T includes the first member 21 and the second member 22 connected in a manner longitudinally displaceable relative to each other. Such a telescopic contact member may be replaced by a threaded-shaft contact member that axially rotates to allow extension and contraction, an extendable elastic contact member, a winding-up contact member, or a contact member extendable with a link arm.

In the above example, the contact member 20T extends and contracts as the locking member 33 is moved using the position retainer 30 to rotate the contact member 20T. The contact member may extend and contract independently of the rotation. For example, the contact member may be extended or contracted manually in accordance with the rotational position of the contact member.

In the above example, the contact member 20T is placed in contact with the cut edge We of the workpiece W using the edge We as a reference of positioning. The contact member 20T may be placed in contact with another edge different from the edge We receiving the blade 5 using the other edge as a reference of positioning.

In the above example, the groove 12 on the ruler body 10 is used to lock the contact member 20T at the rotational position. The contact member 20T may be locked using a portion other than the groove 12. For example, the distal end of the retention arm 31 may be fastened to the edge of the ruler body 10 with thread engagement. Multiple thread engagement units may be arranged in the front-rear direction.

In the above example, the oblique positioning units (detents) are arranged for positioning at angles of inclination including ±10°, ±20°, ±22.5°, ±30°, ±40°, ±45°, ±50°, and ±60°. Other angles may be used as appropriate, and more or less positioning units may be used as appropriate.

The auxiliary attachment 35 may be replaced by multiple attachments with different lengths. Any auxiliary attachment with a length suitable for the rotational position (extendable length) of the contact member 20T may be used in a replaceable manner. This structure prevents the auxiliary attachment from protruding laterally from the ruler body 10. An extendable auxiliary attachment may also be used.

In the above example, the portable machining apparatus 1 is a portable circular saw as a portable cutting machine. The portable machining apparatus 1 may be a jigsaw. The guide ruler may also be used with a portable machining apparatus such as a grooving cutter or a router for cutting grooves.

REFERENCE SIGNS LIST

W workpiece
We cut edge
1 portable machining apparatus
2 base
3 machining body
4 electric motor
5 blade (chip saw)
6 blade cover
7 handle
8 battery pack
R guide ruler
10 ruler body
10a guide edge
11 guide rail
12 groove
12a opening width
12b opening edge
12c groove width
12d engagement recess (positioning unit)
13 sliding sheet
20 positioner
20T contact member
21 first member
21a guide wall (front)
21b guide wall (rear)
21c insertion hole
21d support hole
22 second member
22a elongated slot
22b wider portion
23 guide protrusion
23a flange
24 contact part
24a boss
24b, 24c flat surface
25 fixing screw
26 contact part
26a boss
27 fixing screw
28 engagement pin
30 position retainer
31 retention arm
31a recess
32 thumbscrew
33 locking member
33a lateral width
33b engagement step
33c cylindrical part
33d screw hole
33e outer diameter of cylindrical part 33c
33f outer diameter of engagement step 33b
33g height
34 compression spring
35 auxiliary attachment
36 wood screw

What is claimed is:

1. A guide ruler for guiding a portable machining apparatus in a machining direction relative to a workpiece, the guide ruler comprising:
a ruler body; and
a positioner configured to position the ruler body relative to the workpiece, the positioner including
a contact member to be in contact with an edge of the workpiece, the contact member being extendable along the edge of the workpiece,
a support supporting the contact member in a manner rotatable on a lower surface of the ruler body, and
a position retainer configured to retain the contact member at a rotational position.

2. The guide ruler according to claim 1, wherein
the contact member is extendable longer along the edge of the workpiece at a greater angle with a direction orthogonal to a longitudinal direction of the ruler body.

3. The guide ruler according to claim 1, wherein
the contact member includes
an elongated first member, and
an elongated second member connected to the first member in a manner displaceable in a longitudinal direction of the first member.

4. The guide ruler according to claim 3, wherein
the first member includes a pair of guide walls configured to guide the second member in the longitudinal direction.

5. The guide ruler according to claim 3, wherein
the second member has an elongated slot, and
the guide ruler further comprises a guide protrusion placed through the elongated slot and attached to the first member.

6. The guide ruler according to claim 5, wherein
the guide protrusion is located between the pair of guide walls in a longitudinal direction of the contact member.

7. The guide ruler according to claim 5, wherein
the second member has a wider portion on an end of the elongated slot to allow removal of the guide protrusion.

8. The guide ruler according to claim 5, wherein
the contact member includes a contact part to be in contact with the edge of the workpiece at a position opposite to the support from the guide protrusion.

9. The guide ruler according to claim 1, wherein
the ruler body has a groove supporting a first end of the contact member in a movable manner.

10. The guide ruler according to claim 9, wherein
the position retainer is located at the groove.

11. The guide ruler according to claim 10, wherein
the groove is located on an upper surface of the ruler body, and
the position retainer includes a locking member protruding upward from the groove, the locking member being configured to lock the first end of the contact member.

12. The guide ruler according to claim 11, wherein
the groove includes a positioning unit configured to restrict movement of the locking member along the groove,
the locking member is displaceable in a depth direction of the groove to engage with the positioning unit at a shallower position, and
the locking member is urged toward the shallower position.

13. The guide ruler according to claim 1, wherein
the support is cylindrical and to be in contact with the edge of the workpiece.

14. The guide ruler according to claim 1, further comprising:
an auxiliary attachment attachable to the contact member and to be in contact with the edge of the workpiece.

15. The guide ruler according to claim 4, further comprising:
an auxiliary attachment attachable to the guide walls and to be in contact with the edge of the workpiece.

16. The guide ruler according to claim 2, wherein
the contact member includes
an elongated first member, and
an elongated second member connected to the first member in a manner displaceable in a longitudinal direction of the first member.

17. The guide ruler according to claim 4, wherein
the second member has an elongated slot, and
the guide ruler further comprises a guide protrusion placed through the elongated slot and attached to the first member.

18. The guide ruler according to claim 6, wherein
the second member has a wider portion on an end of the elongated slot to allow removal of the guide protrusion.

19. The guide ruler according to claim 6, wherein
the contact member includes a contact part to be in contact with the edge of the workpiece at a position opposite to the support from the guide protrusion.

20. The guide ruler according to claim 7, wherein
the contact member includes a contact part to be in contact with the edge of the workpiece at a position opposite to the support from the guide protrusion.

* * * * *